INVENTOR.
LESLIE M. PACKARD
MAYNARD R. CHANCE
BY
AGENT

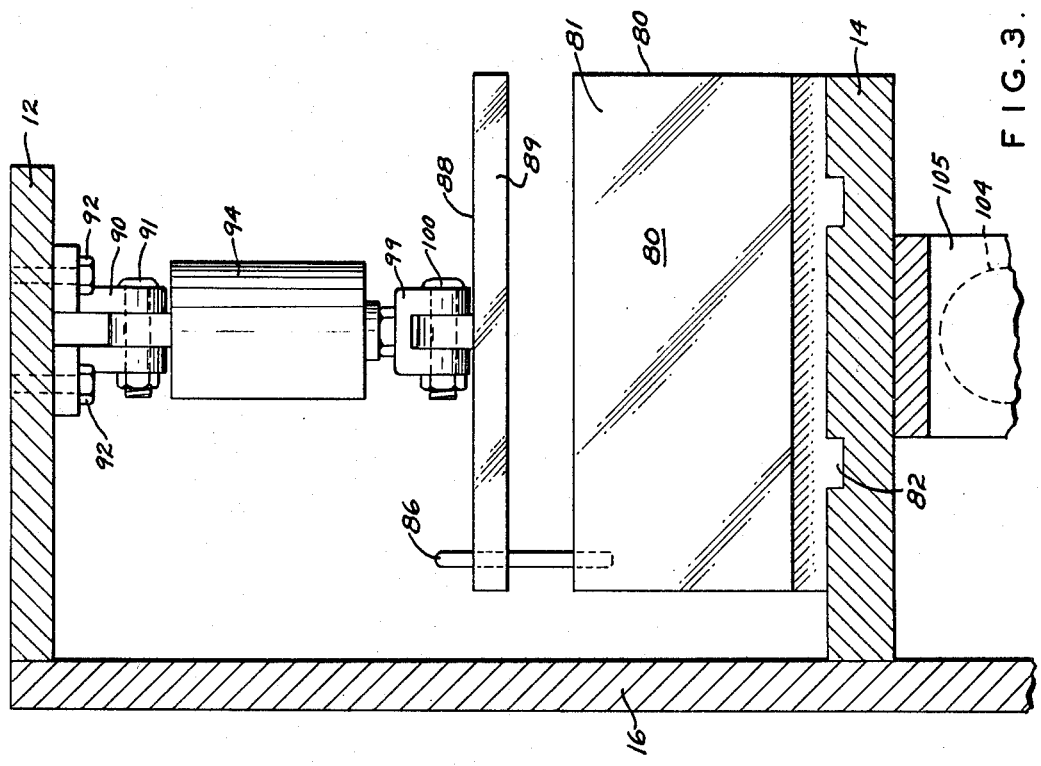
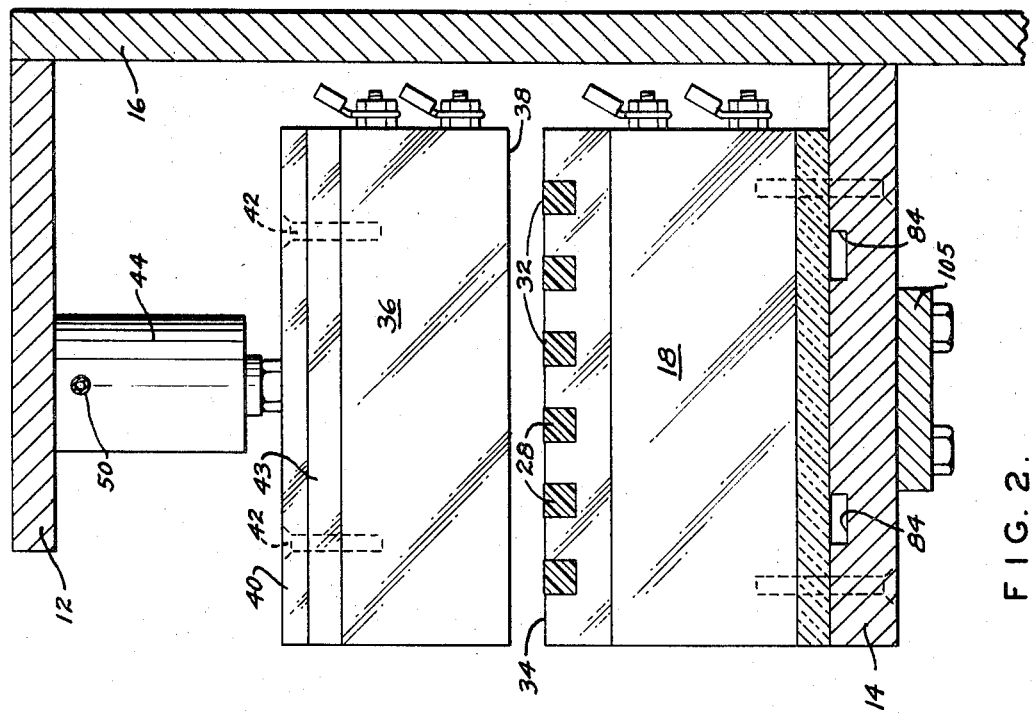

United States Patent Office 3,432,374
Patented Mar. 11, 1969

3,432,374
MACHINE FOR BONDING ABUTTING STRIPS
Leslie M. Packard, Rosenberg, and Maynard R. Chance, Houston, Tex., assignors to ACF Industries, Incorporated, New York, N.Y., a corporation of New Jersey
Filed June 29, 1964, Ser. No. 378,572
U.S. Cl. 156—366
Int. Cl. B32b 35/00
5 Claims

ABSTRACT OF THE DISCLOSURE

A machine for bonding halogenated olefin polymers which requires specific heat, time pressure and a specific bonding flux to achieve optimum bonds, between surfaces of unsintered olefin polymers. The machine includes structure for retaining strips of the polymer under a predetermined mechanical pressure from all sides thereof for a predetermined time at a specific temperature to achieve the desired bond.

---

This invention relates generally to a novel apparatus for forming a strong bond between two surfaces, one or both of the surfaces being halogenated olefin polymers. In a more particular aspect the invention relates to a method and apparatus for bonding fluoroolefin polymers such as perfluorobutadiene, trifluorochloroethylene and tetrafluoroethylene.

In the chemical industry, as well as in related industries, the use of various fluoroolefin polymers has gained considerable importance in the transportation of strong corrosive fluids. Pipes and valves for controlling the flow of these strong chemical ladings are lined with fluoroolefin polymers as well as with other plastic materials to prevent corrosion. Fluoroolefin polymers are also used as gaskets, valve seats, valve stem packings and in many other applications in addition to the linings of pipes and valves. Gaskets, stem packings, pipe linings, and the like are generally formed by aggregating synthesized particles of the desired resin into the approximate desired shape known generally as a "preform" and sintering the preform by applying heat to coalesce the preform into a solid nonporous mass of the desired shape.

Because of the nonadhesive waxy surface characteristics of fluoroolefin polymers, it has been exceedingly difficult to obtain a bond of even low mechanical strength between fluoroolefin polymers and themselves or any other known plastic material and it has been impossible to produce a bond which has a mechanical strength in the range of 90% of the strength of sintered fluoroolefin polymers. Therefore, fabrication of fluoroolefin polymers has not been commercially feasible.

Accordingly, it is a primary object of this invention to provide a novel method for bonding solid fluoroolefin polymers to themselves or to other materials in such a manner as to yield a substantially impervious bond having a mechanical strength above 90% of the solid fluoroolefin polymer employed.

It is a further object of this invention to provide a novel machine for forming a bond between two surfaces, at least one of the surfaces being a fluoroolefin polymer.

Other and further objects of this invention will be obvious upon a clear understanding of the illustrative embodiment and the method about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein;

FIGURE 2 is an elevational view of the invention taken along line 2—2 of FIGURE 1 with parts broken away and shown in section.

FIGURE 3 is an elevational view of the invention taken along line 3—3 of FIGURE 1 with parts broken away and shown in section.

Briefly, this invention is directed to a novel method and machine for forming relatively impervious bonds between two surfaces, one of the surfaces being composed of a fluoroolefin polymer.

According to the present invention, a flux, composed of a mixture of micro-sized unsintered particles of the specific fluoroolefin polymer to be bonded mixed in the range of 50% to 80% by weight with a fluorocarbon oil, is disposed in intimate contact with each of the surfaces such as by coating the surfaces. The coated surfaces are then brought into abutment and heated in the range of 680 to 740° F. preferably 700 to 715° F. under a vertical containing pressure in the range of 2 p.s.i. to 41 p.s.i. and under an end restraining pressure of 50 p.s.i. to 1500 p.s.i. for a period of 5 to 30 minutes preferably 15 to 25 minutes and more preferably 20 minutes to effect the desired bond. The assembled and bonded surfaces are then removed from the machine, cooled in the air from 0 to 5 minutes approximately and then cooled in water at ambient temperature. The mechanical strength of the bond which is produced by the above method is consistently 90% or above of the strength of the fluoroolefin polymer.

In the practice of the invention, the surfaces to be bonded are preferably smooth and flat insuring intimate contact throughout the entire surface area so that the resulting bond will have high strength and will be substantially impermeable.

In the case of Teflon strip .189 x .275 inch in cross section a load of 145 lbs. is required to cause breakage. After using the method and device disclosed herein, two strips of Teflon of the same size bonded together, as indicated, required 138 lbs. load to cause breakage.

Figure 1:
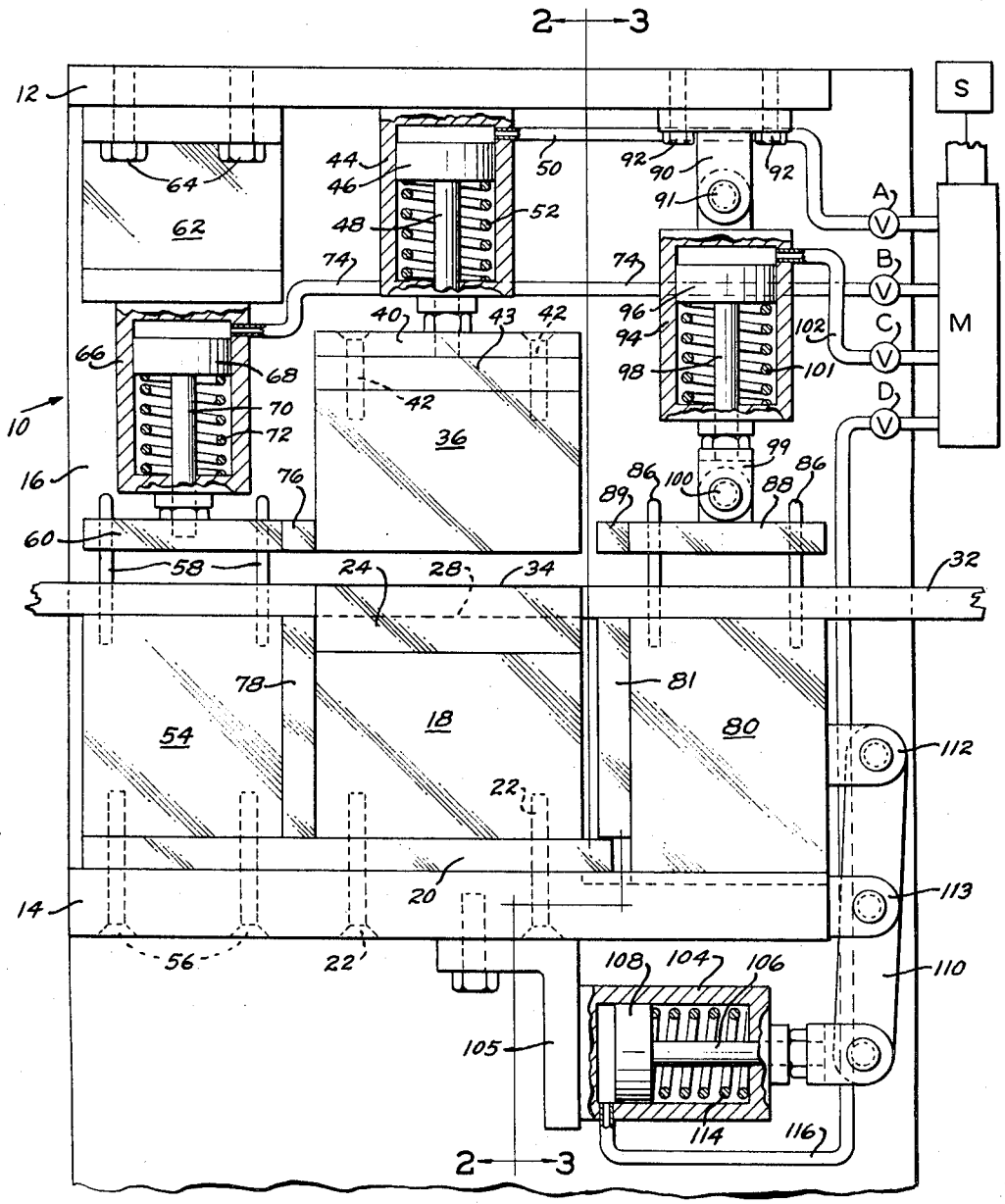
FIGURE 1 is a front elevational view of the invention with portions broken away and shown in section.
Figure 4:
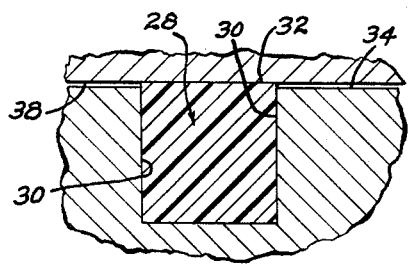
FIGURE 4 is a sectional view illustrating the strip plate and upper platen relationship in detail.

Referring now to the drawings for a better understanding of this invention, a preferred embodiment 10 of the invention is illustrated in FIGURES 1, 2 and 3 which includes a generally horizontal upper support plate 12 and a lower support plate 14, which are generally parallel and which are fixed to a vertical support member 16. A lower heating platen 18, preferably formed of aluminum, is spaced from the lower support plate 14 by an insulating plate 20 and is fixed to the support plate by screws 22 which extend through openings formed in the support plate 14 and in the insulation plate 20 and are threaded into theraded bores formed in the heater platen 18. A strip plate 24, also preferably formed of aluminum, is positioned at the upper extremity of the heater platen 18. The strip plate 24 may either be fixed to the platen 18 or it may be removable from the platen as desired. Removable strip plates will facilitate greater production capability, because the operator may form the strips to be bonded into assembly in a removable strip plate while another removable strip plate is being heated in the machine to bond other strips. A series of slots 28 (FIGURES 2, 3 and 4) are formed in the upper surface of the strip plate 24 to receive the strip material to be bonded. The cross sectional dimension of the slots 28 are such, relative to the size of the strip material (FIGURE 4) that a tight fit may be obtained between the edges of the strip material and the lateral surfaces 30 defining the slots 28. The depth of the slots 28 is such, relative to the thickness of the material to be bonded, that the upper surface 32 of the material to be bonded is positioned slightly above the upper surfaces 34 of the strip plate. An upper heater platen 36 is fixed to the upper support plate 12 and is adapted for relative movement downwardly so that the lower surface 38 thereof may come into intimate contact with the upper surfaces 32 of the strips of material to be bonded. The upper heater platen 36, also preferably formed of aluminum, is fixed to an air cylinder support plate 40 by screws 42, which extend through the support plate 40 and through an insulator plate 43 positioned between the support plate 40 and the upper heater platen 36. The screws 42 are threaded into threaded bores formed in the upper portion of the platen 36. A fluid motor type actuating device 44 fixed to the upper support plate 12 includes a spring biased piston 46 having a stem 48 fixed thereto. The support plate 40 is fixed to the lower extremity of the stem 48 whereby downward movement of the piston 46 will cause the lower surface 38 of the upper heater platen 36 to move into contact with the upper surface 32 of the strips to be bonded. A fluid conduit 50 opening into the upper portion of the fluid motor 44 above the piston 46 is controlled by a valve A for transporting fluid under pressure from a pressurized source S through a manifold M to the fluid motor 44 to actuate the piston 46 downwardly. For returning the upper platen to its uppermost position a compression spring 52, positioned about the stem 48 within the fluid motor 44 and below the piston 46, will force the piston 46 to its uppermost position when the fluid pressure chamber above the piston is not pressurized. The valve A is so constructed that in its off position the fluid above the piston 46 will be bled to the atmosphere. The fluid motor structure described above is set forth only as illustrative and is not to be taken in a limiting sense in regard to this application. Various well-known types of platen operating mechanisms may be suitable for incorportion in this invention without departing from the spirit or scope thereof.

A stationary clamping block 54 is fixed to the lower support plate 14 by a series of screws 56 which extend through bores formed in the support plate 14 and in the insulating plate 20 and are threaded into threaded bores formed in the clamping block 54. A pair of guide pins 58 extend vertically from the upper surface of the clamping block 54 and receive a reciprocable pressure plate 60. A C bracket 62 attached to the upper support plate 12 by means of bolts 64 supports a fluid motor 66 for actuation of the pressure plate 60. The fluid motor 66 which may be of the same construction or of the same general operation as the fluid motor 44 includes a piston 68 having a stem 70 depending therefrom. The lower extremity of the stem 70 is fixed to the upper portion of the pressure plate 60. A compression spring 72 serves to bias the piston 68 toward its uppermost position to raise the pressure plate 60 in the same manner as described above in regard to the compression spring 52 in the fluid motor 44. A fluid conduit 74 opening into the fluid motor 66 above the piston 68 is provided for conducting pressurized fluid from the source S into the fluid motor 66 under control of a valve B to cause downward actuation of the piston 68 and the pressure plate 60. The pressure plate 60, when actuated downwardly by the fluid motor 66 will engage and clamp the strips of material to be bonded to the clamping block 54 to restrain the strip material against longitudinal movement during the bonding process. An insulating plate 76 is fixed to the pressure plate 60 and an insulating plate 78 is fixed between the clamping block 54 and the heating platen 18 to retain the bonding heat within a confined area and to prevent excessive heating of the clamping structure.

A movable clamping block 80 is slidably mounted on the lower support plate 14 by means of generally parallel guide lugs 82 (FIGURE 3) on the clamping block which are received within generally parallel guide slots 84 formed in the support plate 14. An insulating plate 81 is supported on one side of the clamping block 80 and is disposed between the clamping block and the paten 18. A pair of guide pins 86 extend vertically from the clamping block 80 and pass through bores formed in a pressure plate 88 for guiding vertical movement of the pressure plate. An insulating plate 89 is fixed to one side of the pressure plate 88 and disposed between the pressure plate and the platen 36. A clevis support member 90 is fixed to the upper support plate 12 by bolts 92 and supports a fluid motor 94 by means of a pivot pin 91 for actuation of the pressure plate 88. A stem member 98 which depends from a piston 96 within the fluid motor 94 has a clevis 99 affixed to the lower extremity thereof for pivotal connection to the pressure plate 88 by a pivot pin 100. A compression spring 101 is positioned within the fluid motor and exerts a force on the lower surface of the piston 96 to move the piston to its uppermost position in the absence of fluid pressure above the piston 96. A fluid conduit 102 opening into the upper portion of the fluid motor 94 above the piston 96 transports pressurized fluid from the pressurized fluid source S to the fluid motor 94 under control of a valve C. Thus upon opening the valve C, fluid under pressure will flow from the source S through the manifold M, through the conduit 102 and into the fluid motor 94 above the piston 96. Pressure exerted by the fluid against the piston 96 will overcome the force of the spring 101 and will move the piston and the pressure plate downward until contact is made between the lower surface of the pressure plate 88 and the upper surface 32 of the strips of material to be bonded. A fluid motor 104 fixed to the lower surface of the support plate 14 by a support bracket 105 has an actuating stem 106 driven by a piston 108 at one end thereof and pivotally connected to a pivot arm 110 at the other end. The pivot arm 110 is pivotally connected to an arm 112 fixed to the movable clamping block 80 and pivotally connected to an arm 113 fixed to the lower support plate 14. Movement of the stem 106 of the fluid motor 104 in one direction will, therefore, cause the arm 110 to pivot about the arm 113 to induce movement of the clamping block 80 in the opposite direction. A compression spring 114 is positioned within the fluid motor 104 and serves to bias the piston 108 in a direction to move the clamping block 80 away from the platen 18. A conduit 116 is connected at one end thereof into the fluid motor 104 on the side of the piston 108 remote from the spring 114 and is controlled at the other end thereof by a control valve D to transport pressurized fluid from the pressurized manifold M to the fluid motor 104.

Figure 5:
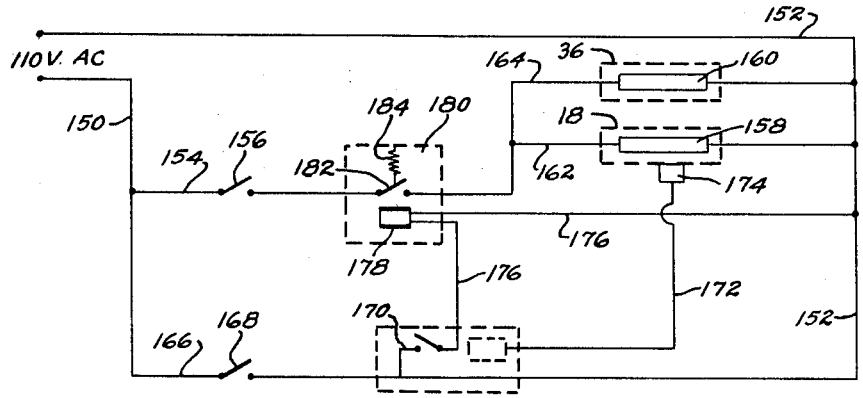
FIGURE 5 is a schematic illustrating the circuitry for heating and temperature control of the bonding machine of FIGURE 1.

As illustrated schematically in FIGURE 5, a heating circuit for heating the heater platens 18 and 36 is connected across a pair of conductors 150 and 152 having an electrical potential, for example, an alternating current of 115 volts. The heating circuit includes a conductor 154 having a manually actuated switch 156. A pair of conventional electrical heating elements 158 and 160, one associated with each of the heater platens 18 and 36, are connected in conductors 162 and 164 in parallel with the conductor 154. The conductors are each connected to the current source conductor 152. A temperature control circuit for the controlling of the heat in the heating elements 158 and 160 comprises a conductor 166 connected between the conductors 150 and 152. The control circuit is manually controlled by closing a switch 168 to energize a temperature control device 170. The temperature control device may be any one of various well-known commercially available temperature control devices, and is responsive to a signal current induced through a conductor 172 by a thermocouple 174 to control the flow of current through a relay control circuit 176. The flow of current through the circuit 176, in response to the heat in the heating device 158, energizes a solenoid 178 in a relay 180 positioned in the circuit 154 to cause closing of a relay switch 182 against the bias of a relay switch spring 184. Upon deenergization of the solenoid control circuit 176, the spring 184 will open the switch 182, causing deenergization of the heating circuit 154. The relay 180 controlling the energization of the heating circuit will, therefore, be controlled in response to the degree of heat in the platen 18 to maintain the platen heat within the desired temperature range. For example, the platens for the bonding process will be maintained between 700° F. and 715° F. The specific relay circuit structure and temperature control circuit is set forth as illustrative rather than limiting in regard to this application. Various other well-known relay and heat control circuitry may be effectively employed without departing from the spirit or scope of this invention.

Figure 6:
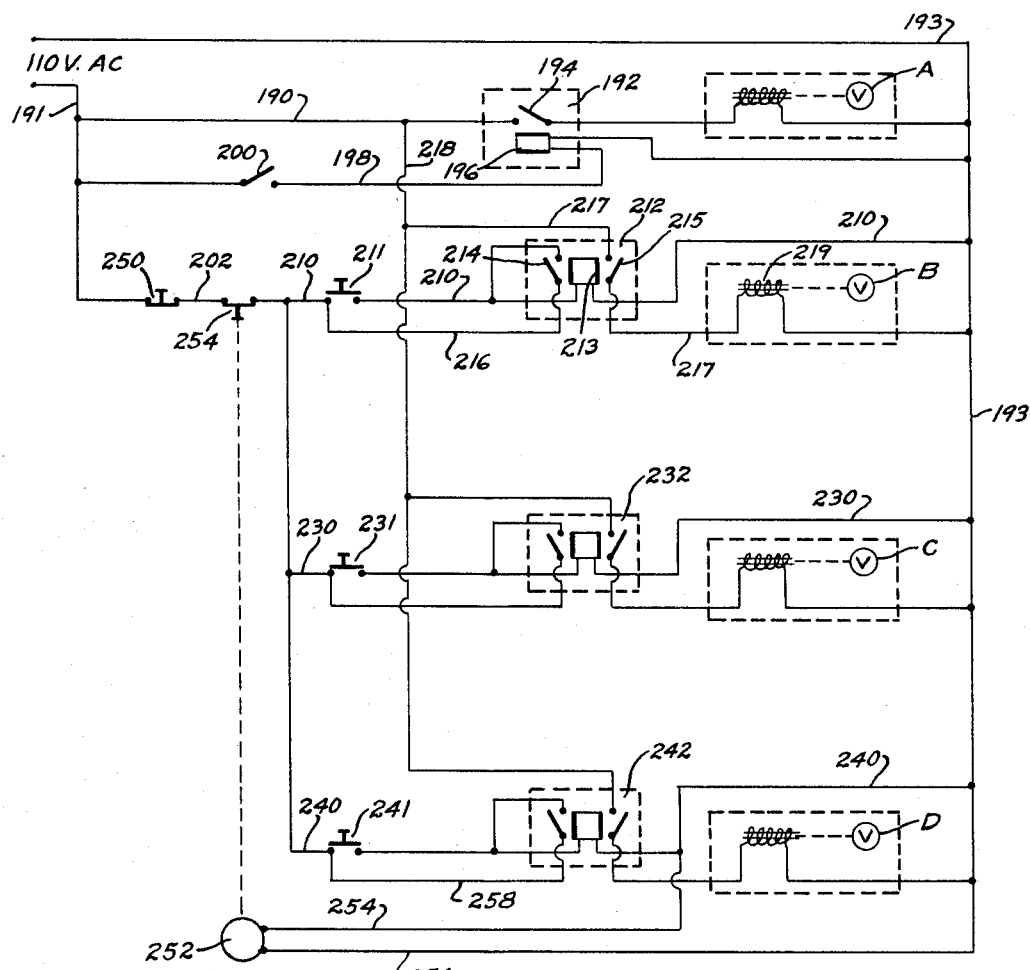
FIGURE 6 is a schematic illustrating the circuitry for solenoid valve control of the bonding machine of FIGURE 1.

With reference now to FIGURE 6, electrical circuitry is schematically illustrated for controlling the solenoid valves A, B, C and D for control of the fluid motors of the machine. A conductor 190 is connected across a pair of conductors 191 and 193 which define a source of electrical potential, for example, a source of 110 volt alternating current, and has a single pole relay 192 connected therein for controlling opening and closing of a solenoid energized valve A. The relay 192 may be any one of many commercially available relays without altering the spirit or scope of this invention. The relay 192 has a switch 194 which is mechanically biased to an open position preventing energization of the solenoid valve A. A coil 196 is connected to a conductor 198 and is energized by being directly connected across the conductors 191 and 193 upon closing of a manually controlled switch 200. Upon energization of the coil 196 the switch 194 of the relay 192 is moved to its closed position completing the circuit in which the solenoid valve A is placed and thereby causing the solenoid valve to be moved to its open position to allow the fluid motor 44 to be energized. Three double pole relay controlled circuits 210, 230 and 240 are connected in parallel with a conductor 202 for selectively controlling energization of the three solenoid valves B, C and D. Each of the circuits is energized through momentary switches 211, 231, and 241 respectively to actuate a relay controlled holding circuit associated therewith and all of the circuits 210, 230 and 240 may be simultaneously deenergized by opening a manually operated stop switch 250. The stop switch may be actuated at any time during the bonding process to cause closing of the solenoid valves B, C, and D, for example, in the event of an emergency. In each of the circuits 210, 230 and 240 are disposed identical double pole relays 212, 232 and 242, respectively, which might be any one of many commercially available relays suited for the purpose desired. Upon momentary closing of the switch 211, a coil 213 of the relay 212 which is connected in the conductor 210, is energized and in turn causes closing of two relay switches 214 and 215 which are normally mechanically biased to the open position thereof. Upon closing of the relay switch 211 a holding circuit 216, connected at one end to the conductor 210 is energized. The holding circuit is connected in parallel with the conductor 210 and forms a bypass for the switch 211. After initial energization of the relay 212 the momentary switch may be opened and the coil 213 will remain energized through the holding circuit 216. When the coil 213 is energized the relay switch 215 will be moved to and retained in its closed position thereby energizing a solenoid valve actuating circuit 217 which is connected in parallel to the conductor 190 through a conductor 218.

Upon closing of the relay switch 215 by energization of the coil 213, the circuit 217 is connected across the source of electrical potential thereby energizing the solenoid 219 of the solenoid valve B, causing the solenoid to move the valve to its open position to energize the fluid motor 66. The circuitry and the energization thereof involving energization of the solenoid valves C and D is substantially identical to that described above in regard to energization of the solenoid valve B. The solenoid valve energizing circuits for the solenoid valves B, C and D are all connected in parallel with the conductor 190.

All three of the parallel solenoid control circuits are time controlled by an electrically energized timing device 252 which mechanically controls opening and closing of a switch 254 in the conductor 202. The timing device also may be any one of various devices suited for the desired purpose. The timing device 252 is connected by a conductor 254 to the coil energizing circuit 240 of the relay 242 and by a conductor 256 to the source conductor 193. Upon energization of the coil circuit 240 by closing the momentary switch 241, the timing device is energized through the conductors 254 and 256 and begins the timing cycle. Since the momentary switch 241 is bypassed by a holding circuit 258, in the manner described above in regard to the relay 212, the timing device being connected to the circuit 240 through the holding circuit 258 will remain energized. The timing device 252 after being energized for a predetermined period of time will open the switch 254 thereby breaking the circuit to the relays 212, 232 and 242 and causing the respective solenoid valves B, C and D to be moved to their unenergized open condition. The timing device is adjustable thereby allowing the cycle time of the bonding operation to be varied, if so desired.

To achieve a bond equal to 90% of the strength of virgin sintered polytetrafluoroethylene the following process has been employed with consistent success. The heater control circuit, FIGURE 5, of the machine is energized and the platens 18 and 36 are heated to the optimum temperature in the range of 700° to 715° F. The end surfaces of the polytetrafluoroethylene strip are coated with a thin coating of a flux composed of micro-sized particles of unsintered polytetrafluoroethylene in the range of 50% to 95% with a fluorocarbon oil. The strip or strips to be bonded are placed in the grooves 28 in the removable strip plate 24 with the end surfaces to be bonded in intimate contact. The machine operator then manually positions the strip plate 24 on the upper surface of the lower heater platen 18 and closes the switch 200 (FIGURE 6) to energize the electrical circuit controlling the solenoid valve A. When the circuit controlling the valve A is energized by closing the switch 200, the valve A will move to its open position allowing the fluid under pressure to flow from the source S, through the manifold M, through the conduit 50 and into the fluid motor 44. The piston 46 will be forced downwardly by the pressurized fluid and through the stem 48 will actuate the upper heater platen 36 downwardly into contact with the strip 32 of the material to be bonded. The material to be bonded will be tightly clamped between the upper heater platen 36 and the lower heater platen 18.

The circuit controlling valve B is energized by closing the switch 211 causing energization of the relay 212 which controls opening of the solenoid valve B. The solenoid valve B upon being energized will move to its open condition allowing fluid under pressure to flow from source S, through the manifold M through the conduit 74 and into the fluid motor 66. The piston 68 in the fluid motor 66 will be forced downwardly and through the stem 70 will actuate the pressure plate 60 downwardly into contact with the upper surface 32 of the strip material to be bonded. The material to be bonded will be tightly clamped between the pressure plate 60 and the clamping block 54.

The circuit controlling the solenoid valve C is energized by closing the switch 231, which causes energization of the relay 232 and actuation of the solenoid valve C. The valve C will move to its open condition and fluid under pressure will flow from the source S through the manifold M through the conduit 102 and into the fluid motor 94. The piston 96 in the fluid motor 94 will be forced downwardly and through the stem 98 will actuate the pressure plate 88 downwardly into contact with the strip 32 of the material to be bonded. The material to be bonded will be tightly clamped between the pressure plate 88 and the clamping block 80. After clamping pressure has been applied, longitudinal pressure is applied to the strip material by closing the switch 241 which energizes the relay 242 and controls the valve D which in turn causes opening of valve D and actuation of the fluid motor 104 by the pressurized fluid from the source S through conduit 116. As the stem 106 is actuated outwardly of the fluid motor 104 by the piston 108 the arm 112 is forced to move in the opposite direction by virtue of its connection with the pivot arm 110 and in turn drives the clamp block 80 in a direction towards the lower platen 18. Since the fluid motor 94, which drives the pressure plate 88, is pivotally connected to both the clevis support member 90 and to the pressure plate 88, the pressure plate will move with the clamping block toward the upper platen 36. The strip 32 of material to be bonded will, therefore, be put under longitudinal pressure substantially equal to the force developed by the fluid motor 104. The strip joint to be bonded, therefore, will be maintained under axial and lateral compression during the bonding process. It has been found that axial pressures in the range 2–41 p.s.i. and lateral pressures in the range of 50 to 1500 p.s.i. give consistently good results. The surfaces to be bonded are maintained under compression and heat in the range of 700° to 715° F. for a period of 5 to 20 minutes under the control of a delay timer 252 in the electrical circuit 202. A switch 254 which is controlled by the delay timer 252 opens switch 202 after the passage of a predetermined period of time and, therefore, causes the respective fluid motors 44, 94 and 104 to be deactivated and thereby release the longitudinal pressure applied by fluid motor 104 and the vertical pressure applied by fluid motors 44 and 94. The heating circuit, FIGURE 5, will remain energized as long as the switch 200 is closed. The operator manually opens the switch 200 causing the valve A to close, thereby causing fluid pressure to bleed from the fluid motor 66. The spring 72 returns the piston 68 to its uppermost position which causes the pressure plate 60 to move upwardly releasing the pressure on the strip. The bonded strip of material 32 is allowed to cool for a time interval from 0 to 5 minutes and is then cooled to ambient temperature in water. It has been found that polytetrafluoroethylene bonded in the above identified bonding method will consistently have a bond strength equivalent to 90% or above of the strength of virgin polytetrafluoroethylene.

It will be evident from the foregoing that we have provided a novel method and apparatus for forming a substantially impervious bond between two surfaces one or both of which are halogenated olefin polymers, the mechanical bond strength being equal to 90% of the strength of the parent polymer. The invention, therefore, is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A machine for achieving a relatively impervious bond between two strips of material composed of fluoroolefin polymer comprising a first heating element, groove means on said first heating element for aligning the ends of said strip material to be bonded, a second movable heating element, motor means for moving said second heating element into intimate contact with the material to be bonded and cooperating with said groove means for applying lateral pressure to said material from all sides thereof, support means positioned on either side of said first heating element for supporting said strip material, means for clamping said strip material to said support means, means for moving the surfaces to be bonded into intimate contact and for applying longitudinal pressure to the strip material during the bonding process.

2. A machine for achieving a relatively impervious bond between two strips of material, one of the strips being composed of tetrafluoroethylene, said machine comprising a first heating element, groove means on said first heating element for aligning the surfaces of said strip material to be bonded, a second movable heating element normally spaced from said first heating element, motor means for moving said second heating element into intimate contact with the material to be bonded and cooperating with said groove means for applying lateral pressure to the material from all sides thereof, support means positioned on either side of said first heating element for supporting said strip material, means for clamping said strip material to each of said support means, means for moving the surfaces to be bonded into intimate contact and for applying longitudinal pressure to the material, means for maintaining said lateral pressure and said longitudinal pressure for a predetermined period of time.

3. A machine for achieving a relatively impervious bond between two strips of material composed of tetrafluoroethylene, said machine comprising a first heating element, groove means formed in said first heating element for aligning the end surfaces of said strip material to be bonded, a second movable heating element normally spaced from said first heating element, motor means for moving said second heating element into intimate contact with the material to be bonded and cooperating with said groove means for applying lateral pressure to the material to be bonded from all sides thereof, support means positioned on either side of said first heating element for supporting said strip material, means for clamping said strip material to each of said support means, means for moving the surfaces to be bonded into intimate contact and for applying longitudinal pressure to the material, means for maintaining said first and second heating elements within a specific temperature range, means for maintaining said lateral pressure and said longitudinal pressure for a predetermined period of time.

4. A machine for bonding one strip of material to another strip of material, one of the strips being composed of a fluoroolefin polymer, said machine comprising a first heated platen formed with at least a single groove for aligning said strips to be bonded, the groove being less in depth than the thickness of the strips to be bonded whereby the strips, when positioned in the groove extend slightly above the surface of the platen, a second heated platen having a substantially planar surface and being positioned in spaced relation to said first platen, motor means connected to said second platen and adapted to move the second platen toward the first platen whereby the planar surface of the second platen will engage the strip material and maintain the same under lateral compression from all sides thereof, support means positioned one on either side of the first platen, a motor controlled pressure member one for each of the support means and being positioned in spaced relation to the associated support means, each of said pressure members being movable into contact with the strips to lock the same in position on the support means, at least one of the support means being movable toward the first platen to induce longitudinal pressure to the surfaces to be bonded, motor means for inducing movement to the movable support means.

5. A machine for bonding one strip of material to another strip of material, both of the strips being composed of tetrafluoroethylene, said machine comprising a first heated platen formed with at least a single groove for aligning said strips to be bonded, the groove being less in depth than the thickness of the strips to be bonded whereby the strips, when positioned in the groove extend slightly above the surface of the platen, a second heated platen having a substantially planar surface and being positioned in spaced relation to said first platen, a fluid motor connected to said second platen and adapted to move the second platen toward the first platen whereby the planar surface of the second platen will engage the strip material and maintain the same under lateral compression from all sides thereof, support means positioned one on either side of the first platen, a fluid motor controlled pressure member for each of the support means and being positioned in spaced relation to the associated support means, each of said pressure members being movable into contact with the strips to lock the same in position on the support means, at least one of the support means being movable toward the first platen to induce longitudinal pressure to the surfaces to be bonded, a fluid motor for inducing movement to the movable support means, electrical control means for controlling the actuation of each of said fluid motors.

References Cited

UNITED STATES PATENTS 2,516,602  7/1950  Snyder _____ 156—507 XR

FOREIGN PATENTS 579,147  7/1946  Great Britain.

EARL M. BERGERT, *Primary Examiner.*

H. F. EPSTEIN, *Assistant Examiner.*

U.S. Cl. X.R.

100—93; 18—17; 156—581, 583